US 8,517,135 B2

(12) United States Patent
Schapf et al.

(10) Patent No.: US 8,517,135 B2
(45) Date of Patent: Aug. 27, 2013

(54) VEHICLE SUSPENSION SYSTEM HAVING ADJUSTABLE TRACK WIDTH

(75) Inventors: Ronald Schapf, Ottawa (CA); David Belzile, Granby (CA); Martin Heon, Sherbrooke (CA); Vincent Tognon, Drummondville (CA); Marc Gagnon, Austin (CA)

(73) Assignee: Bombardier Recreational Products Inc., Valcourt (CA)

( * ) Notice: Subject to any disclaimer, the term of this patent is extended or adjusted under 35 U.S.C. 154(b) by 338 days.

(21) Appl. No.: 12/989,770

(22) PCT Filed: Apr. 30, 2008

(86) PCT No.: PCT/US2008/062044
§ 371 (c)(1),
(2), (4) Date: Oct. 26, 2010

(87) PCT Pub. No.: WO2009/134254
PCT Pub. Date: Nov. 5, 2009

(65) Prior Publication Data
US 2011/0048833 A1    Mar. 3, 2011

(51) Int. Cl.
*B60K 17/34* (2006.01)
(52) U.S. Cl.
USPC .......................................................... 180/233
(58) Field of Classification Search
USPC .......................................................... 180/233
See application file for complete search history.

(56) References Cited

U.S. PATENT DOCUMENTS

| | | | |
|---|---|---|---|
| 4,079,807 A | 3/1978 | Hornagold et al. | |
| 4,109,747 A | 8/1978 | Hornagold et al. | |
| 4,630,701 A | 12/1986 | Venetjoki | |
| 5,282,644 A | 2/1994 | Larson | |
| 5,489,113 A | 2/1996 | Torborg | |
| 6,139,045 A | 10/2000 | Vandenbark et al. | |
| 6,206,126 B1 | 3/2001 | Thiermann et al. | |
| 7,255,195 B2 | 8/2007 | Haruna | |

FOREIGN PATENT DOCUMENTS

| | | |
|---|---|---|
| DE | 3153007 A1 | 10/1983 |
| DE | 19933052 C1 | 11/2000 |
| FR | 2419855 | 10/1979 |
| FR | 2519599 | 7/1983 |
| FR | 2688184 A1 | 9/1993 |
| WO | 9637375 A1 | 11/1996 |
| WO | WO 9637375 A1 * | 11/1996 |
| WO | 2005056308 A1 | 6/2005 |
| WO | WO 2005056308 A1 * | 6/2005 |

OTHER PUBLICATIONS

International Search Report of PCT/US2008/062044; Jan. 16, 2009; Olivier Savelon.
English Abstract of DE19933052, Nov. 23, 2000.
English Abstract of FR2419855, Oct. 12, 1979.
English Abstract of FR2519599, Jul. 18, 1983.
English Abstract of FR2688184, Sep. 10, 1993.

* cited by examiner

*Primary Examiner* — Tashiana Adams
(74) *Attorney, Agent, or Firm* — BCF LLP

(57) ABSTRACT

A vehicle is disclosed having front and rear suspension systems adapted to change the track width of the vehicle.

13 Claims, 8 Drawing Sheets

VEHICLE SUSPENSION SYSTEM HAVING ADJUSTABLE TRACK WIDTH

CROSS-REFERENCE

The present application is the United States National Stage of PCT/US2008/062044, filed Apr. 30, 2008, entitled 'Vehicle Suspension System Having Adjustable Track Width', the entirety of which is incorporated herein by reference.

FIELD OF THE INVENTION

The present invention relates to suspension systems for vehicles in general, and more specifically to vehicle suspension systems having adjustable track width.

BACKGROUND OF THE INVENTION

Recreational utility vehicles (RUVs) are four-wheel vehicles adapted for off-road transportation. They are often referred to as side-by-side All-Terrain Vehicles (ATVs) which typically have single straddle-type seats. RUVs are typically all-wheel drive vehicles with rugged front and rear suspensions to allow them to access difficult terrain such as hills and wooded areas where there are only trails and narrow paths or no path at all.

In many circumstances, there would be an advantage in being able to adjust the width of the track of the RUV to access particular areas or to add stability to the vehicle. For instance, in heavily wooded areas where trees are close together, a narrow wheel track would allow the RUV to pass between trees where it wouldn't be possible with vehicle having a wider wheel track. In another instance, such as when travelling along the side of a fairly steep hills transversely or at an angle relative to the direct climb, a wide track would provide increased stability and push back the roll-over threshold of the vehicle allowing it to pass where it wouldn't be possible with a vehicle having a narrower wheel track.

Similarly, on the road, there are instances where it would be an advantage to be able to adjust the width of the track of the vehicle to access particular areas or to add stability to the vehicle. For instance, in narrow streets, densely populated areas, or tight parking situations, a narrow wheel track would improve the manoeuvrability of the vehicle. At the opposite, at higher speeds when negotiating a bend on the road and cornering at high speed, a wider wheel track would improve the stability and cornering ability of the vehicle.

A vehicle equipped with a suspension system adapted for quick and easy adjustment of the front and rear wheel track would be able to access an increased number of areas and/or perform better in a greater number of situations.

Some off-road and military vehicles have been designed with hydraulic or pneumatic suspensions adapted for adjusting the ride height of the vehicle which can be very useful in specific circumstances. However the vehicle's height is raised and the wheel track of vehicle is reduced by the suspension arms pushing the vehicle up at the expenses of suspension travel, shock absorbing ability, dampening ability and vehicle stability. At maximum height, the suspension travel is at its minimum rendering the vehicle more unstable with a higher center of gravity and less shock absorbing and dampening from the suspension. (U.S. Pat. No. 6,036,201).

Some other off-road vehicles such as snowmobiles were designed with a chassis having multiple mounting or anchoring points for the front suspension such that the track of the skis can be adjusted in the shop by painstakingly disconnecting the suspension arms from their present anchoring points on the chassis, and reinstalling the suspension arms at new anchoring points thereby increasing the ski stance. (U.S. Pat. No. 6,311,798)

Thus, there would be a need for a vehicle having a suspension system with adjustable track width that addresses at least some of these inconveniences.

SUMMARY OF THE INVENTION

One aspect of the invention provides a suspension system having a controllably adjustable track width.

Another aspect of the invention provides a vehicle comprising: a frame; a central longitudinal axis; at least four wheels suspended from the frame, each of the at least four wheels including a tire; an engine mounted to the frame and being operatively connected to at least two of the at least four wheels; a steering assembly operatively connected to at least two of the at least four wheels; a suspension having left and right upper suspension arms and left and right lower suspension arms, each suspension arms having a proximal end and a distal end; and an actuated adjustment mechanism that simultaneously adjust a distance between the proximal ends of the left and right upper and lower suspension arms and the central longitudinal axis of the vehicle.

Another aspect of the invention provides that the actuated adjustment mechanism includes at least one left lever member pivotally connected to the frame and at least one right lever member pivotally connected to the frame, the left upper and lower suspension arms connected to the at least one left lever member and the right upper and lower suspension arms connected to the at least one right lever member; the at least one left and one right lever members actuated to laterally move the left and right upper and lower suspension arms relative to the central longitudinal axis of the vehicle.

In a further aspect, the invention provides an upper and a lower left lever member pivotally connected to the frame and an upper and a lower right lever member pivotally connected to the frame; wherein the upper and lower left and right lever members each include a first end, a second end and a pivot point located between the first end and the second end; the left upper and lower suspension arms being connected to the first end of the upper and lower left lever member respectively, the right upper and lower suspension arms being connected to the first end of the upper and lower right lever member respectively, the second ends of the upper and lower left and right lever members operatively connected to an actuator.

Another aspect of the invention provides the actuator includes an endless screw connected to the second ends of the upper and lower left and right lever members via a nut slidably mounted onto the second ends of the upper and lower left and right lever members and a rotary actuator operatively connected to the endless screw.

A further aspect of the invention provides a steering system including left and right steering rods both connected to a first rack & pinion assembly mounted to a support member, the support member connected to a second rack & pinion assembly. The first rack & pinion assembly is adapted to adjust a distance between the left and right steering rods and the central longitudinal axis of the vehicle.

Another aspect of the invention provides that the first rack & pinion assembly is actuated by a rotary motor which is synchronized with the actuated adjustment mechanism.

Another aspect of the invention provides a vehicle comprising: a frame; at least four wheels suspended from the frame, each of the at least four wheels including a tire; an engine mounted to the frame and being operatively connected to at least two of the at least four wheels; a steering assembly operatively connected to at least two of the at least four wheels; and a trailing arm rear suspension having a left trailing arm and a right trailing arm, each trailing arm having a proximal end and a distal end, the proximal end of each trailing arm movably connected to the frame; and an actuated adjustment mechanism that simultaneously adjust a distance between the proximal ends of the left and right trailing arms and the central longitudinal axis of the vehicle.

A further aspect of the invention provided that the actuated adjustment mechanism includes a left and right sliding member connected to a rear portion of the frame, the proximal ends of the left and right trailing arms connected to the left and right sliding members respectively, left and right sliding member adapted to laterally move the trailing arm suspension relative to the frame. The left and right sliding members are connected to an endless screw via a nut mounted connected to each left and right sliding member, the endless screw actuated by a rotary actuator.

Another aspect of the invention provides a double A-arm suspension pivotally connected to a lever member which is pivotally connected to the frame of a vehicle and actuated to laterally move the double A-arm suspension relative to the frame of the vehicle.

A further aspect of the invention provides a trailing arm suspension connected to a sliding member which is connected to a frame member of a vehicle and actuated to laterally move the trailing arm suspension relative to the frame.

Another aspect of the invention provides a vehicle having a steering system including left and right steering rods both connected to a first rack & pinion assembly which is mounted to a support member, the support member connected to a second rack & pinion assembly.

Another aspect of the invention provides an all terrain vehicle comprising: a frame; a central longitudinal axis; a suspension having left and right upper suspension arms and left and right lower suspension arms, the left upper and lower suspension arms each operatively connected to the frame at their proximal ends and to a ground engaging element at their distal ends, the right upper and lower suspension arms each operatively connected to the frame at their proximal ends and to a ground engaging element at their distal ends; and a first actuated adjustment mechanism that simultaneously adjust a distance between the proximal ends of the left and right upper and lower suspension arms and the central longitudinal axis of the vehicle.

In a further aspect, the invention provides all terrain vehicle further comprising a trailing arm rear suspension having a left trailing arm and a right trailing arm, each trailing arm having a proximal end and a distal end, the proximal end of each trailing arm movably connected to the frame; and a second actuated adjustment mechanism that simultaneously adjust a distance between the proximal ends of the left and right trailing arms and the central longitudinal axis of the vehicle.

In yet another aspect the invention provides that the first and second actuated adjustment mechanism each include at least one endless screw operatively connected to the left and right upper and lower suspension arms and at least one endless screw operatively connected to the left and right trailing arms respectively and each endless screws is operatively connected to a rotary actuator selected from the group consisting of an electric motor, an electric rotary actuator and an hydraulic rotary actuator.

In another aspect, the invention provides an ECU operatively connected to the first rack & pinion assembly and to the first and second actuated adjustment mechanisms, the ECU synchronizing the actuation of the first rack & pinion assembly and to the first and second actuated adjustment mechanisms.

For purposes of this application, terms used to locate elements on the vehicle, such as "front", "back", "rear", "left", "right", "upper", "lower", "above", and "below", are as they would normally be understood by a rider of the vehicle sitting on the vehicle in a forwardly facing, driving position. The term "longitudinal" means extending from the front to the back. The terms "lateral" and "laterally" means extending sideways from left to right or right to left or perpendicular to the longitudinal axis of the vehicle.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

The present invention will be described with respect to a recreational utility vehicle (RUV). However it should be understood that the present invention could be used on other types of vehicles such as off-road vehicles, all-terrain vehicles, tractors and road vehicles.

Figure 1:
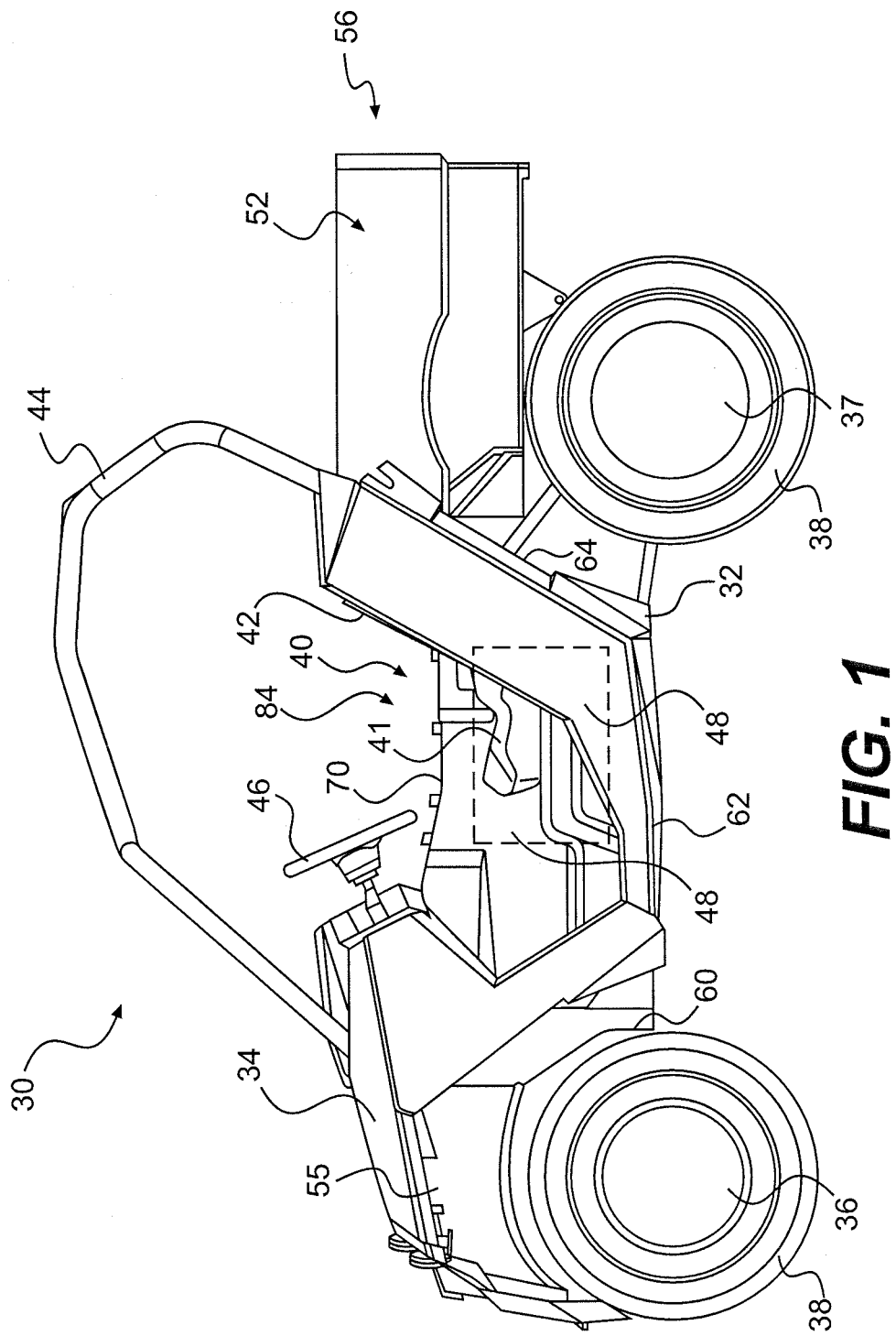
FIG. 1 is a left side elevation view of a recreational utility vehicle (RUV) in accordance with aspects of the present invention.
Figure 2:
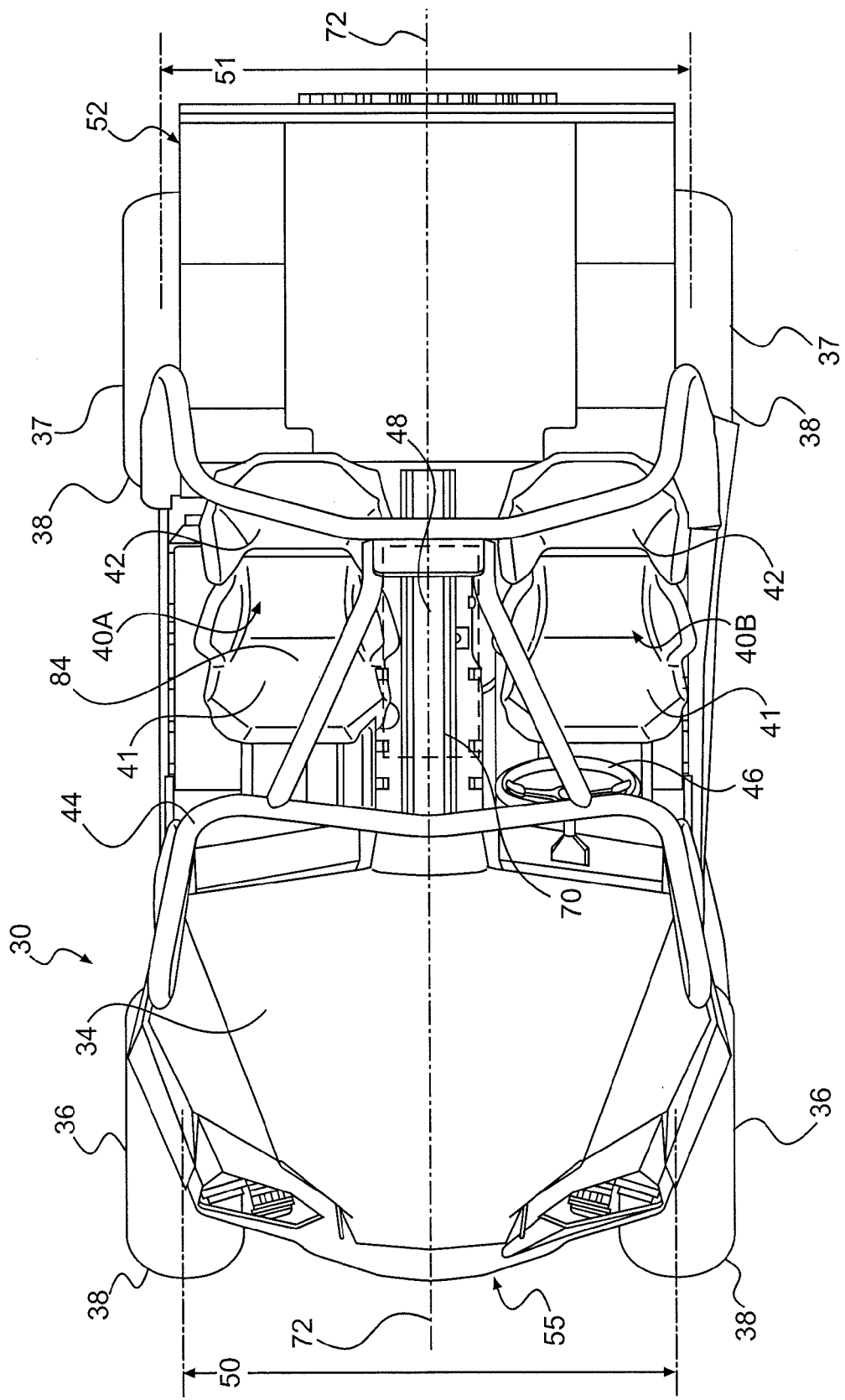
FIG. 2 is a top view of the RUV shown in FIG. 1.
Figure 3:
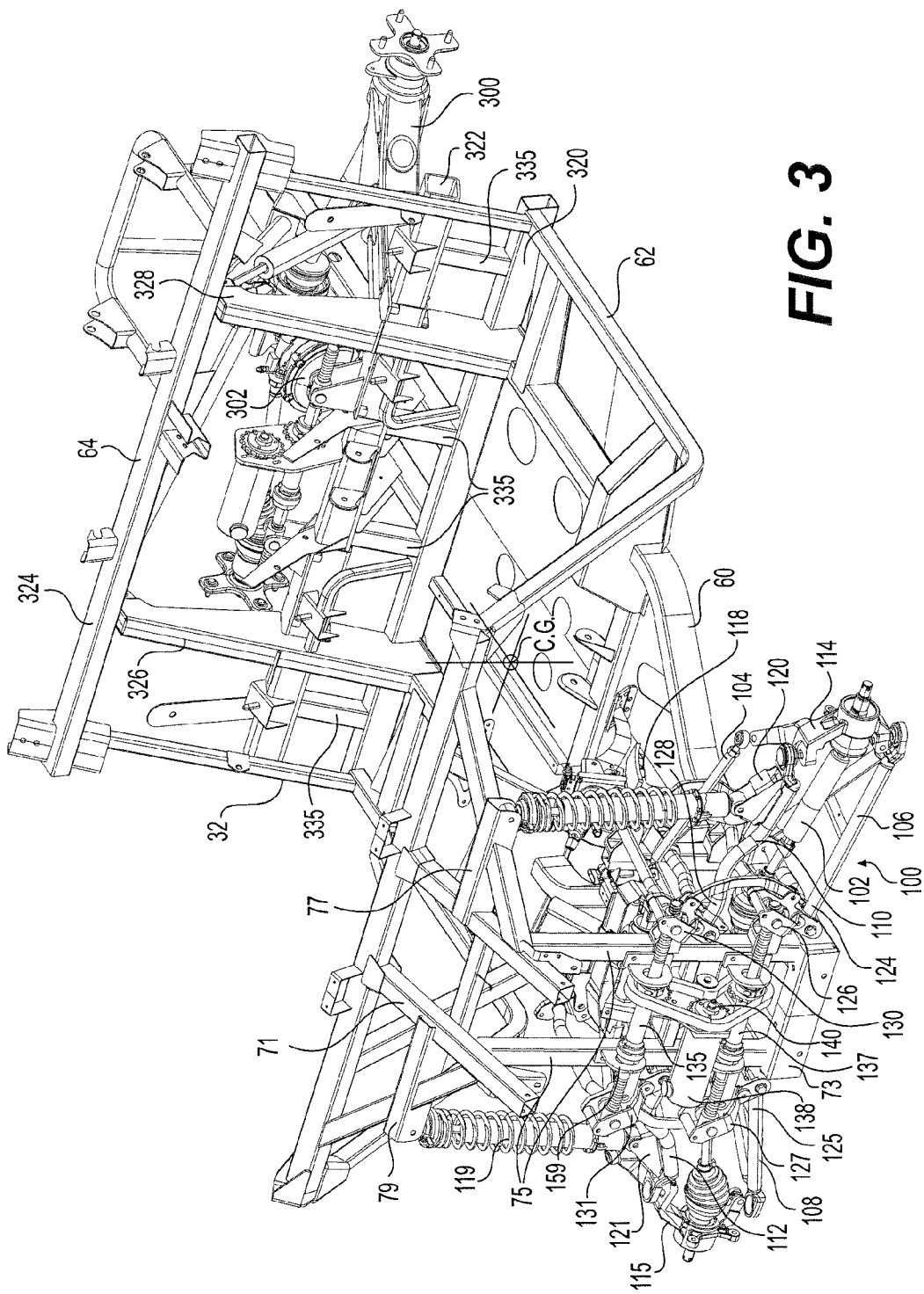
FIG. 3 is a front left perspective view of the frame and suspension system of the RUV shown in FIG. 1.
Figure 7:
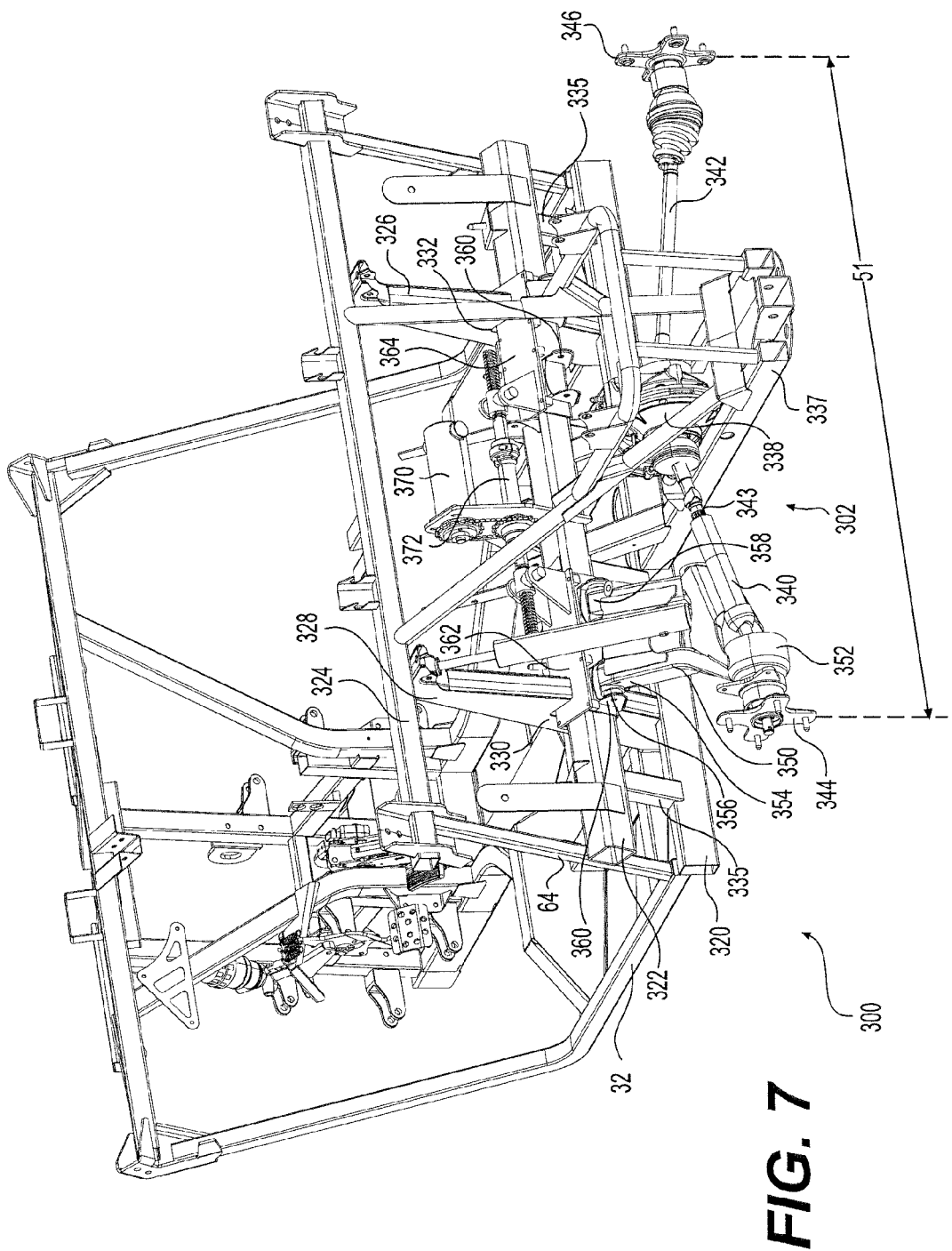
FIG. 7 is a rear perspective view of the frame and rear suspension system of the RUV shown in FIG. 1.
Figure 8:
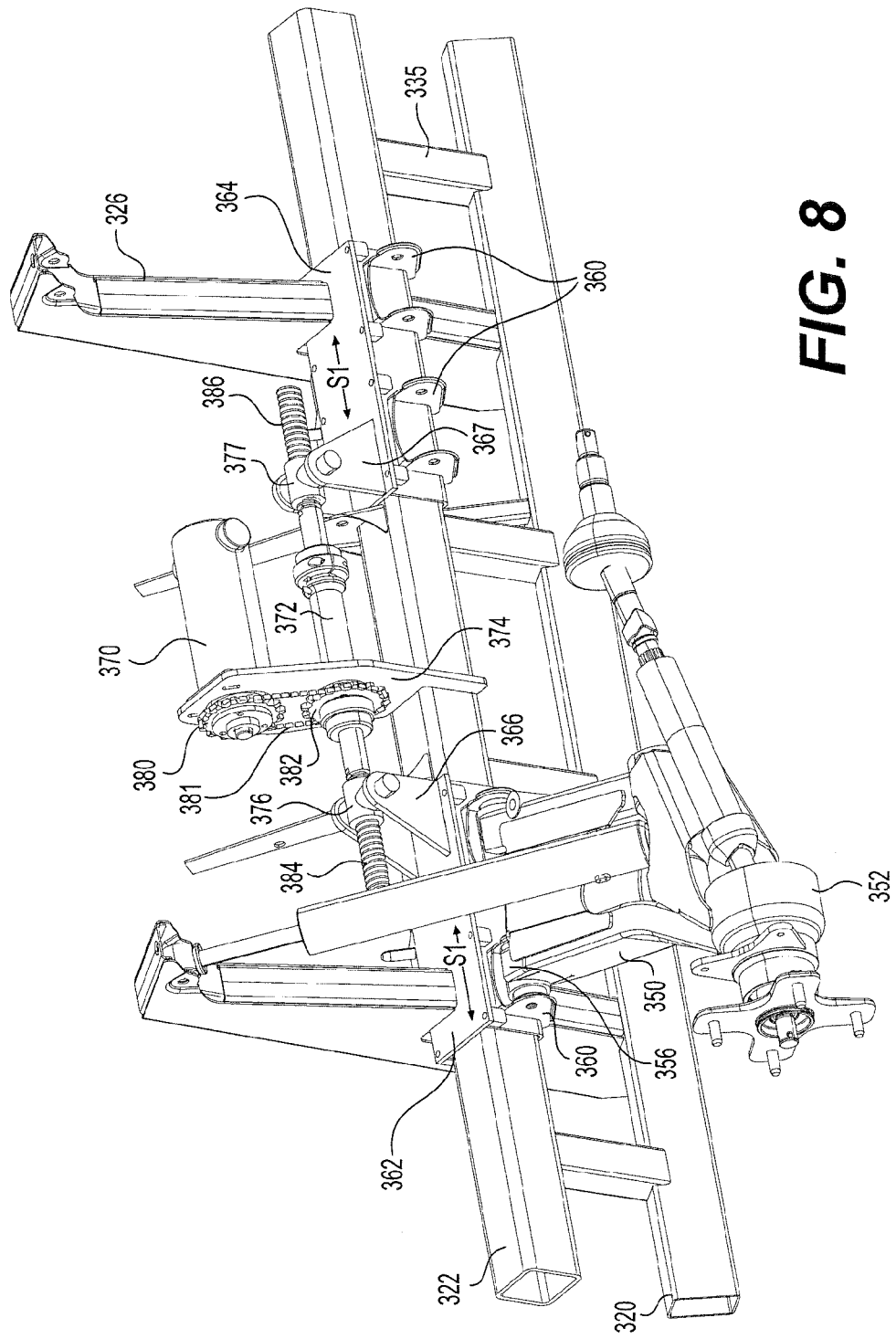
FIG. 8 is a rear perspective view of selected components of the rear suspension shown in FIG. 7.

FIGS. 1 and 2 illustrate an RUV 30. The RUV 30 has a front end 55, a rear end 56 and a driver and passenger area 84. The RUV 30 includes a frame 32 to which a vehicle body 34 is mounted. The frame 32 includes front portion 60, a middle portion 62 and a rear portion 64. A pair of front wheels 36 is suspended from the front portion 60 of the frame 32 via a front suspension system 100 (FIG. 3). A pair of rear wheels 37 is suspended from the rear portion 60 of the frame 32 via a rear suspension system 300 (FIGS. 7 and 8). Each of the four wheels 36, 37 has a tire 38. As best seen in FIG. 2, a right seat 40A and a left seat 40B, each having a seat base 41 and a backrest 42, are mounted laterally beside each other on the middle portion 62 of the frame 32 in the driver and passenger area 84 to accommodate a driver and a passenger. A tubular cage 44 is connected to the frame 32 and is disposed around the driver and passenger area 84. A steering assembly including a steering wheel 46 is disposed in front of the left seat 40B. The steering wheel 46 could be disposed in front of the right seat 40A. The steering assembly is operatively connected to the two front wheels 36 to permit steering of the RUV 30 as will be described in details relative to FIG. 6. An engine 48, shown schematically in dotted lines, is mounted to the middle portion 62 of frame 32 between the right seat 40A and the left seat 40B. The engine 48 is operatively connected to the four wheels 36, 37 to power the RUV 30. It is contemplated that the engine 48 could be operatively connected only to the front wheels 36 or only to the rear wheels 37. A cargo box 52 is pivotally mounted to the frame 32 rearwardly of the seats 40A and 40B. A console 70 positioned between the right seat 40A and the left seat 40B extends along the central longitudinal axis 72 of the RUV 30 and covers and separates the engine 48 from the driver and the passenger.

The front suspension system 100 of the RUV 30 is actuated such that the front wheeltrack 50 of the RUV 30 can be adjusted for different situations. The front wheeltrack 50 is the distance between the centerlines of the front wheels 36. The rear suspension system 300 of the RUV 30 is also actuated such that the rear wheeltrack 51 of the RUV 30 can be adjusted for different situations. The rear wheeltrack 51 is the distance between the centerlines of the rear wheels 37.

The RUV 30 has other features and components such as headlights and handles. As it is believed that these features and components would be readily recognized by one of ordinary skill in the art, further explanation and description of these components will not be provided herein.

FIG. 3 shows the bare frame 32 with all ancillary components removed including the engine 48 in order to expose the frame 32, the front suspension system 100, front drive train 102 and steering system 104 and the rear suspension system 300 and rear drive train 302. The front portion 60 of the frame 32 includes an upper structure 71, a lower structure 73 and upright cross members 75 connecting the upper structure and lower structure 71, 73 and defining a rigid front frame structure.

The front suspension system 100 includes left and right lower A-arms 106 and 108 and left and right upper A-arms 110 and 112. The left upper and lower A-arms 110, 106 are mounted at their distal ends to a spindle 114 onto which the left front brake and the left wheel 36 (not shown) are typically mounted. The right upper and lower A-arms 112, 108, are mounted at their distal ends to a spindle 115 onto which the right front brake and the right wheel 36 (not shown) are typically mounted. A spring and shock absorber assembly 118 is connected at a first end to the left upper A-arm 110 via a bracket 120 and at a second end to a left suspension mounting 77 of the upper structure 71 of front portion 60 of the frame 32. A spring and shock absorber assembly 119 is connected at a first end to the right upper A-arm 112 via a bracket 121 and at a second end to a right suspension mounting 79 of the upper structure 71 of front portion 60 of the frame 32. As illustrated, the center of gravity C.G. of the of the RUV 30 is located near the middle of the frame 32

The proximal ends 124 of the left lower A-arm 106 is connected to a lower lever member 126 and the proximal ends 128 of the left upper A-arm 110 is connected to an upper lever member 130. Similarly, the proximal ends 125 of the right lower A-arm 108 is connected to a lower lever member 127 and the proximal ends 129 of the right upper A-arm 112 is connected to an upper lever member 131. The upper lever members 130, 131 are linked together via an upper endless screw 135 and the lower lever members 126, 127 are linked together via a lower endless screw 137. The upper and lower endless screws 135, 137 are mounted transversely to the upright cross members 75 of the frame 32 via bearings 159 and are actuated by a single electric motor 138 through a gear drive 140 linked to the upper and lower endless screws 135, 137 via belt or chain. It is also contemplated that the electric motor 138 can be replaced by any kind of rotary actuator like electric rotary actuator, hydraulic rotary actuator.

Figure 4:
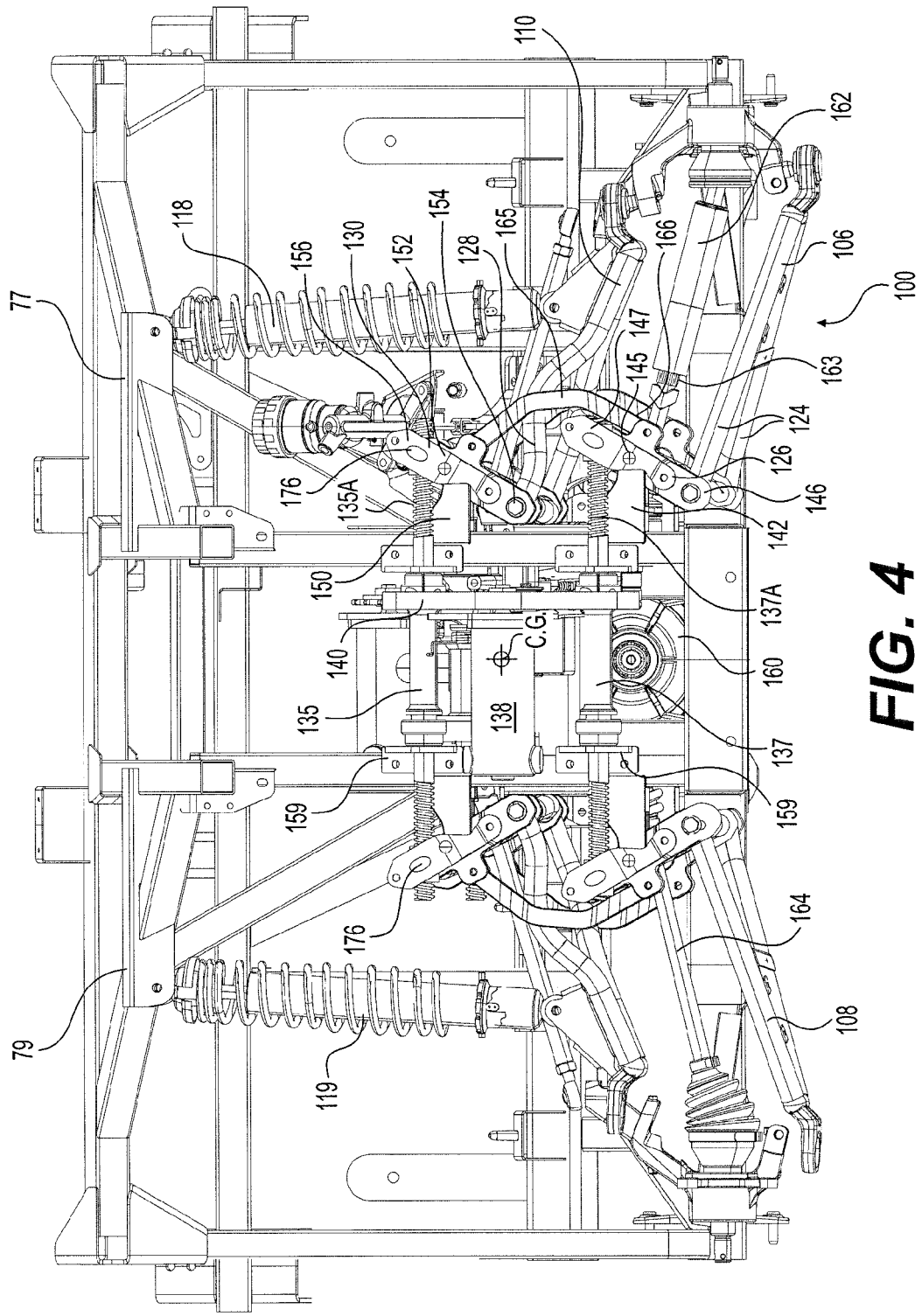
FIG. 4 is a front elevational view of the frame and front suspension of the RUV shown in FIG. 1.

Because the left and right portion of the front suspension system 100 are mirror images of each other, only the left side will be described hereinafter. As best seen in FIG. 4 which is a frontal view of the front suspension system 100, the mid-section of the lower lever member 126 is rotatably mounted to a bracket 142 at a pivot point 145, the bracket 142 being mounted to one of the upright cross members 75 of the frame 32. The proximal end 124 of the lower A-arm 106 is connected to a first end 146 of the lower lever member 126. The left end 137A of the endless screw 137 is connected to the second end 147 of the lower lever member 126 via a nut 177 (FIGS. 5, 6) pivotally and slidably connected to the second end 147 of the lower lever member 126. The nut 177 is slidably mounted through oblong apertures 176 in order to accommodate the arcing path A1, A2, A3, A4 (FIG.5) of the lever members 126, 127, 130 and 131 thereby preventing locking or bending of one of the components. In a similar fashion, the mid-section of the upper lever member 130 is rotatably mounted to a bracket 150 at a pivot point 152, the bracket 150 being mounted to one of the upright cross members 75 of the frame 32. The proximal end 128 of the upper A-arm 110 is connected to a first end 154 of the upper lever member 130. The left end 135A of the endless screw 135 is connected to the second end 156 of the upper lever member 130 via a nut 177 (FIGS. 5, 6) pivotally and slidably connected to oblong apertures 176 in the second end 156 of the upper lever member 130. The lower and upper lever members 126, 130 are connected together via fore and aft stabilization members 165 and 166 best shown in FIG. 6.

Since the RUV 30 shown in FIGS. 1 and 2 is an all-wheel drive vehicle, the front suspension system 100 accommodates a front differential gearbox 160 from which extends left and right drive shafts 162 and 164 which are respectively connected to the left and right spindles 114 and 115. The left and right drive shafts 162 and 164 includes a middle spline connection 163 such that their length may be increased or decreased.

Figure 5:
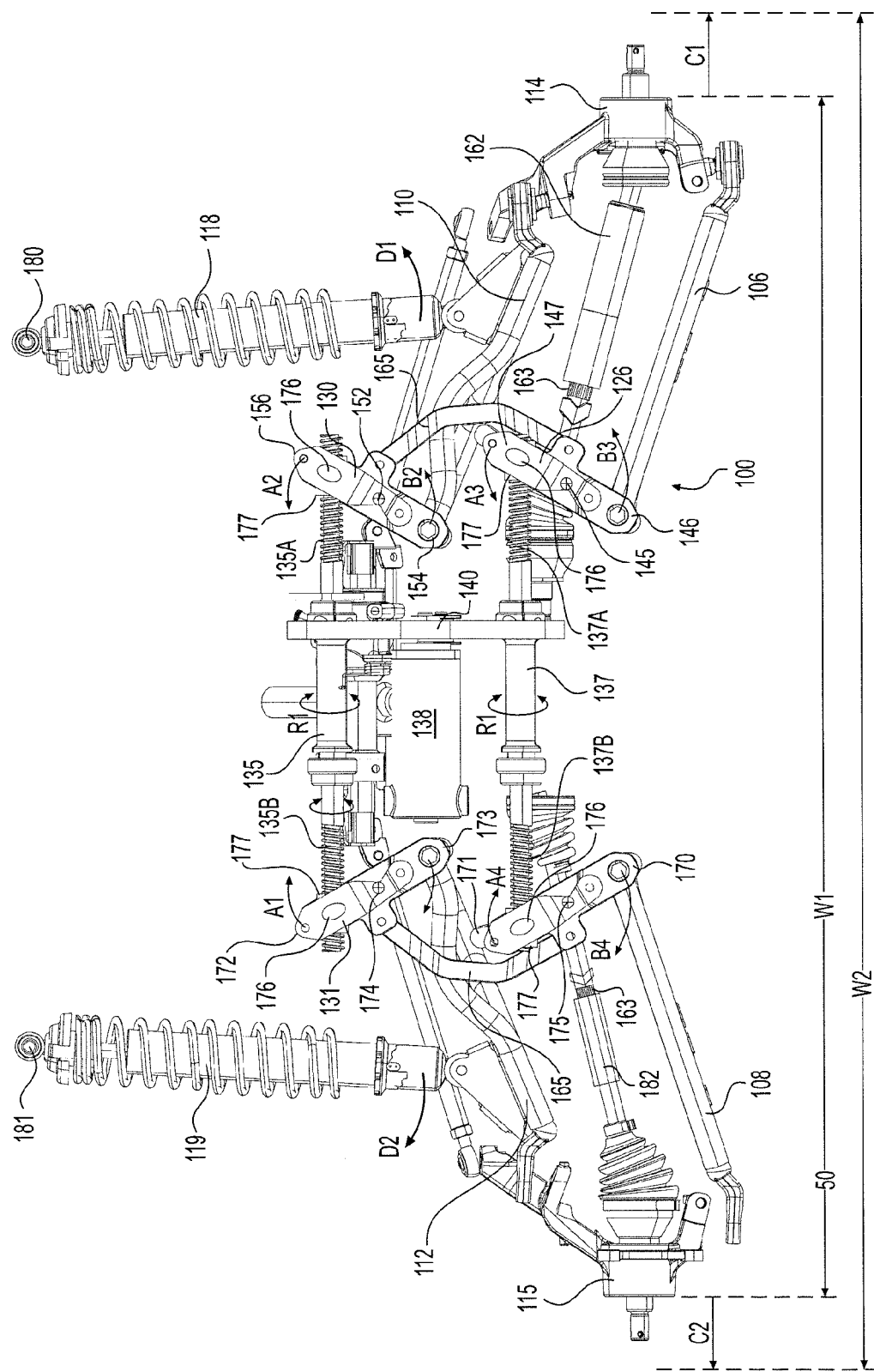
FIG. 5 is a front elevational view of the component of the front suspension shown in isolation without the frame of the RUV.

Referring now to FIG. 5 which is a frontal view of the front suspension system 100 in isolation, the front suspension system 100 is shown with its components positioned to define a narrow wheeltrack W1. As illustrated, the first end 146, 170, 154 and 173 of the upper and lower lever members 126, 126, 130 and 131 are titled inwardly such that the upper and lower A-arms 106, 108, 110 and 112 are retracted inwardly thereby defining a narrow front wheeltrack W1. In operation, to expand the width of the front wheeltrack to a distance W2, the electric motor 138 is activated which in turn rotates the gear drive 140 which imparts a rotation to both the upper and lower endless screws 135, 137. The upper and lower endless screws 135, 137 rotate in the same direction R1. As illustrated, the left ends 135A and 137A of the upper and lower endless screws 135, 137 have left hand threads while the right ends 135B and 137B have right-hand threads. The rotation R1 of the threaded portions 135A, 137A and 135B, 137B of the upper and lower endless screws 135, 137 in effect pull on the nuts 177 which are pivotally and slidably connected to the second ends 147, 156, 171 and 172 of the upper and lower lever members 126, 126, 130 and 131 and impart a pivotal motion to each upper and lower lever members 126, 127, 130 and 131 about their respective pivot points 145, 152, 174 and 175 as depicted by arrows A1, A2, A3 and A4. Consequently, the first ends 146, 154, 170 and 173 of each upper and lower lever members 126, 127, 130 and 131 to which the upper and lower A-arms 106, 108, 110 and 112 are connected pivot outwardly as depicted by arrows B1, B2, B3 and B4 and in so doing push the upper and lower A-arms 106, 108, 110 and 112 and the left and right spindles 114 and 115 outwardly as depicted by arrows C1, C2 thereby expanding the wheeltrack 50 from W1 to W2. As the front suspension 100 is expanding outwardly, the upper ends 180, 181 of the spring and shock absorber assemblies 118, 119 remain fixed to the left and right suspension mountings 77, 79 (FIG. 4) while the lower ends 183, 184 of the spring and shock absorber assemblies 118, 119 which are connected to the upper A-arms 110, 112 move laterally to follow the outward motions of the upper A-arms 110, 112 as depicted by arrows D1, D2.

As the front suspension 100 expands outwardly, the length of the drive shafts 172, 182 also expands through the middle spline connections 163. The steering system 104 must also adapt to the change in wheeltrack configuration of the front suspension 100 and will be described in detail with reference to FIG. 6.

Obviously, the front suspension 100 is retracted from the wide wheeltrack W2 to the narrow wheeltrack W1 simply by reversing the rotation of the electric motor 138.

When the track width of the front suspension 100 has been extended from the narrow wheeltrack W1 to the wide wheeltrack W2 or vice versa, the center of gravity C.G. of the RUV remains substantially unaltered lengthwise and widthwise but the height of the C.G. will vary slightly up or down. The travel of the upper and lower A-arms 106, 108, 110 and 112 also remains substantially unchanged such the shock absorbing and dampening ability of the front suspension 100 are maintained.

In one specific embodiment, the upper and lower lever members 126, 127, 130 and 131 abut against a stopper when reaching wheeltrack dimension W1 or W2 and are locked in place by the torque applied by the electric motor 138.

In order to maintain the geometry of the front suspension 100 from the narrow wheeltrack W1 to the wide wheeltrack W2 or vice versa, and everywhere in between, the dimensions of the upper and lower lever members 126, 127, 130 and 131 are identical providing equal pivotal motion throughout; the rotation of the upper and lower endless screws 135, 137 are equal to one another as both are actuated by the single electric motor 138; the threaded portions 135A, 137A and 135B, 137B of the upper and lower endless screws 135, 137 as well as each nut 177 have identical thread patterns, and the stabilization members 165 and 166 provide equalization to prevent misalignment of the upper and lower A-arms 106, 108, 110 and 112 and maintain the relative distance between equal at all time.

Figure 6:
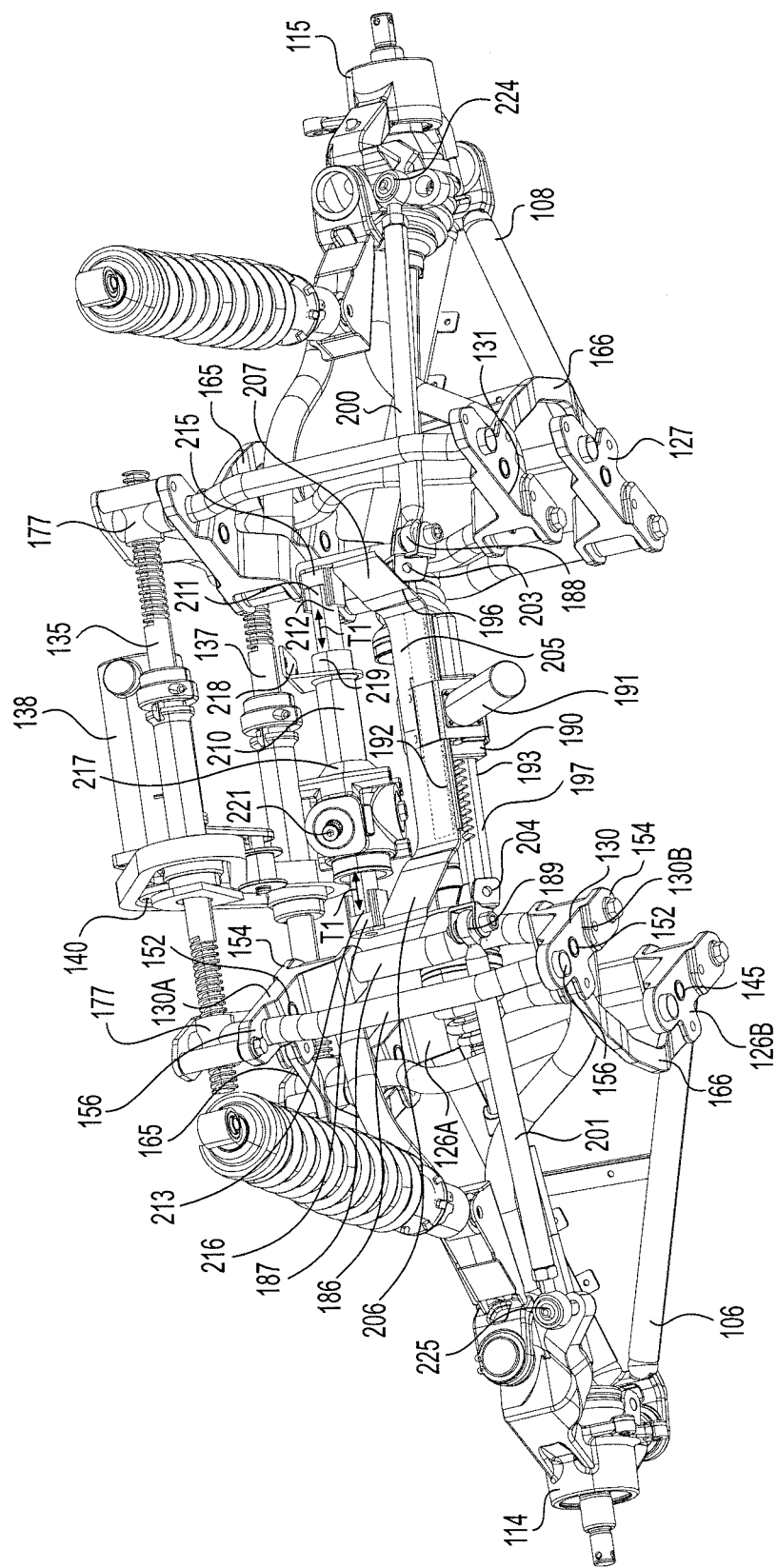
FIG. 6 is a rear left perspective view of the front suspension system and steering system shown in isolation without the frame of the RUV.

Referring now to FIG. 6 which is a rear left perspective view of the front suspension system 100 in isolation, it can be seen that the upper and lower lever members 126, 127, 130 and 131 are structures consisting of a front lever, a rear lever and upper and lower cross members connecting the front and rear levers together and rigidifying the lever members 126, 127, 130 and 131. All lever members 126, 127, 130 and 131 are of similar construction. For instance, the upper lever member 130 includes a front lever 130A, a rear lever 130B, an upper cross member 186 connecting the second ends 154 of the front and rear levers 130A, 130B together and a lower cross member 187 connecting the first ends 156 of the front and rear levers 130A, 130B together. The profiles of the cross members of each upper and lower lever members 126, 127, 130 and 131 may vary slightly to accommodate other components of the front suspension system 100. The upper and lower cross members 186, 187 could be removed provided that other endless screws 135, 173. As previously mentioned, the upper members 130, 131 and the lower lever members 126, 127 are connected together via a pair of stabilization members 165 and 166 to prevent distortion and misalignment when the wheeltrack 50 of the front suspension system 100 is expanded or retracted.

To maintain the geometric integrity of the steering system 104 when the wheeltrack 50 is changed, the steering system 104 includes two rack & pinion systems 190 and 210. The proximal ends 188, 189 of the steering rods 200, 201 are connected to a dual rack & pinion assembly 190 consisting of an electric motor 191 having a pinion gear (not shown) which engages two racks 192, 193. The right hand rack 192 shown in dotted lines is engaged to the top portion of the pinion gear of the electric motor 191 while the left hand rack 193 is engaged to the bottom portion of the pinion gear electric motor 191. The extremity 196 of the right hand rack 192 is connected to the proximal end 188 of the steering rod 200 via bracket 203 while the extremity 197 of the left hand rack 193 is connected to the proximal end 189 of the steering rod 201 via bracket 204. The dual rack & pinion assembly 190 is rigidly mounted to a support member 205. In operation, when the wheeltrack 50 is being changed, i.e. when the single electric motor 138 is activated, the electric motor 191 is also activated. The rotation of the pinion gear of the electric motor 191 imparts lateral motions to the racks 192, 193 in opposite direction. It is also contemplated that the electric motor 191 can be replaced by any kind of rotary actuator like electric rotary actuator, hydraulic rotary actuator. A clockwise rotation of the pinion gear of the electric motor 191 imparts an outward lateral motion to each left hand and right hand racks 192, 193 that are synchronized with the outward motions of their respective left and right upper and lower A-arms 106, 108, 110 and 112 thereby adjusting the length of the steering rods 200, 201 to the changing wheeltrack 50 and maintaining the geometric integrity of the steering system 104. Obviously, a counter clockwise rotation of the pinion gear of the electric motor 191 imparts an inward lateral motion to each left hand and right hand racks 192, 193 that are also synchronized with the inward motions of their respective left and right upper and lower A-arms 106, 108, 110 and 112. When the dual rack & pinion assembly 190 is activated, the steering rods 200, 201 are moved so as to laterally displace the distal ends 224, 225 to keep the wheels 36 in the same direction during wheeltrack width changes thereby maintaining the geometric integrity of the steering system 104.

The support member 205 is rigidly connected and supported by the rack & pinion system 210. As can be seen, the end portions 206, 207 of the support member 205 are connected to each end portion 211, 213 of the rack 212 via connectors 215, 216. The rack & pinion system 210 is rigidly mounted onto the front portion 60 of the frame 32. The body 217 of the rack & pinion system 210 is bolted onto the frame 32 and a bracket 218 rigidly connected to one end 219 of the body 217 of the rack & pinion system 210 is also bolted onto the frame 32 thereby rigidly connecting the body 217 of the rack & pinion system 210 to the frame 32. The steering wheel 46 is connected to splined end 221 through a steering column (not shown) to effect steering of the vehicle 30. In operation, when the steering wheel 46 is turned, the rack 212 moves laterally to the left or right as depicted by Arrows T1 which laterally moves the support member 205 and all the components mounted to the support member 205 including the electric motor 191, and the two racks 192, 193 which are fixed relative to the support member 205 when the electric motor 191 is not activated. The lateral motion of the support member 205 is therefore transmitted to the steering rods 200 and 201 through the fixed racks 192, 193 and ultimately to the wheels 36 through the spindles 114, 115.

The actions of the dual rack & pinion assembly 190 enable to maintain the geometric integrity of the steering system 104 during wheeltrack width changes while the rack & pinion assembly 210 effects steering of the vehicle 30. The dual rack & pinion assembly 190 remains inactive when there is no wheeltrack width change.

The actions of the dual rack & pinion assembly 190 synchronized with the actions of the endless screws 135, 137 enables changes of the width (W1, W2) of the wheeltrack 50 electronically without the operator having to make mechanical adjustments.

Changes to the width of the front wheeltrack 50 are preferably effected when the RUV 30 is moving at a low speed of 6 to 12 Km/hr in order to reduce the friction resistance of the tires 38. Changes to the width of the front wheeltrack 50 are also preferably effected when the steering angle is less than 15 degrees in either directions.

While a single electric motor 138 is shown and described for actuating the upper and lower lever members 126, 127, 130 and 131, two or more could be used in synchronization.

Referring now to FIG. 7, which is a rear perspective view of the rear suspension system 300 showing the bare frame 32 with all ancillary components removed in order to expose the frame 32 and the rear suspension components, the rear portion 64 of the frame 32 includes a lower cross-beam 320, a middle cross-beam 322 and an upper cross-beam 324 all extending laterally across the RUV 30 from one side to the other. A pair of upright shock mounts 326, 328 are rigidly connected to the lower cross-beam 320 and to the upper cross-beam 324 thereby rigidifying the structure of the rear portion 64 of the frame 32. The upright shock mounts 326, 328 include opening 330 and 332 through which the middle cross-beam 322 extends. The middle cross-beam 322 is not connected to the upright shock mounts 326, 328. The middle cross-beam 322 is rigidly connected to the lower cross-beam 320 through a series of four upright beams 335. A rear frame structure 337 extends from and is rigidly connected to the lower, middle and upper cross-beams 320, 322, and 324 which houses and supports the differential gearbox 338 of the rear drive train 302. Left and right drive shafts 340, 342 extend from the differential gearbox 338 and are connected to wheel hubs 344, 346 to transmit power to the rear wheels 37. Each drive shaft 340, 342 includes a middle spline connection 343 such that the length of the drive shafts 340, 342 can be increased or decreased.

The rear suspension system 300 includes a left trailing arm 350 and a right trailing arm (not shown) which is a mirror image of the left trailing arm 350. The distal end 352 of the left trailing arm 350 is connected to and supports the wheel hub 344 for rotation. The proximal end 354 of the left trailing arm 350 includes a pair of connectors 356, 358 rotatably mounted onto a pair of brackets 360 affixed to a left hand sliding member 362. The right hand sliding member 364 is shown without its trailing arm. The sliding members 362, 364 are slidably mounted onto the middle cross-beam 322 and are adapted to move laterally along the middle cross-beam 322.

Referring now to FIG. 8 which is a rear perspective view of the left hand side of the rear suspension 300 in isolation, an endless screw 372 and an electric motor 370 are transversally mounted to a support member 374 rigidly connected to the middle cross-beam 322. The electric motor 370 includes a drive sprocket 380 which is operatively engaged to a driven sprocket 382 connected to the endless screw 372 via a chain or belt 381 to impart rotational motion to the endless screw 372 when the electric motor 370 is activated. The endless screw 372 is connected to the left hand sliding member 362 via a nut 376 which is connected to a bracket 366 itself rigidly connected to the left hand sliding member 362 Similarly, the endless screw 372 is connected to the right hand sliding member 364 via a nut 377 which is connected to a bracket 367 itself rigidly connected to the right hand sliding member 364. The threaded portion 384 of the endless screw 372 which engages the left hand sliding member 362 through the nut 376 features right-hand threads while the threaded portion 386 of the endless screw 372 which engages the right hand sliding member 364 through the nut 377 features left-hand threads such that when the endless screw 372 rotates in one direction (clockwise or counter clockwise), the sliding members 362, 364 move laterally along the middle cross-beam in opposite direction i.e. outwardly or inwardly. It is also contemplated that the electric motor 370 can be replaced by any kind of rotary actuator like electric rotary actuator, hydraulic rotary actuator. Alternatively, it is also contemplated that a rack and pinion assembly similar to the dual rack and pinion assembly 190 could be used instead of an endless screw. While a single electric motor 370 is shown and described for actuating the sliding members 362, 364, two or more could be used.

In operation, when the driver of the RUV 30 activates the electric motor 370 to expand or decrease the rear wheeltrack 51 typically to match change to the front wheeltrack 50, the drive sprocket 380 imparts clockwise or counter clockwise rotational motion to the endless screw 372 via the chain 381 and driven sprocket 382, the threaded portions 384, 386 push outwardly on the left and right sliding members 362, 364 or pull inwardly on the left and right sliding members 362, 364 such that the sliding members 362, 364 move laterally along the middle cross-beam 322 as depicted by arrows S1. The lateral motion of the sliding member 362, 364 in effect moves the wheels 37 and tires 38 outwardly or inwardly thereby increasing or decreasing the width of the rear wheeltrack 51. The length of the drive shafts 340, 342 can be increased (or decreased) as the sliding members 362, 364 move laterally and change the width of the rear wheeltrack 51. The distance between the proximal end 354 of both trailing arms 350 and the central longitudinal axis of the vehicle 72 is therefore adjusted in order to change the width of the rear wheeltrack 51.

Changes to the width of the rear wheeltrack 51 are preferably effected when the RUV 30 is moving at a low speed of 6 to 12 Km/hr in order to reduce the friction resistance of the tires 38.

In one specific embodiment, the sliding members 362, 364 abut against a stopper when reaching the maximum width and the minimum width of the rear wheeltrack 51 and are locked in place by the torque applied by the electric motor 370.

Whether the track width of the rear suspension 300 is at its maximum or at its minimum or anywhere in between, the center of gravity C.G. of the RUV remains substantially unaltered however there is a slight variation of the height of the C.G. since the upper end of the shock absorber remains fixed and its angle varies. The travel of the trailing arms 350 also remains substantially unchanged such the shock absorbing and dampening ability of the rear suspension 300 are maintained.

The electric motor 138 actuating the endless screws 135, 137 of the front suspension system 100, the electric motor 191 actuating the dual rack & pinion assembly 190 and the electric motor 370 actuating the endless screw 372 of the rear suspension 300 are connected to an ECU (not shown) in order to synchronize the movements of the steering rods 200, 201 with the movement of the upper and lower A-arms 106, 108, 110 and 112 of the front suspension 100, and to synchronize the movement of the left and right trailing arms 350 of the rear suspension 300 with the movement of the upper and lower A-arms 106, 108, 110 and 112 of the front suspension 100. The ECU also monitors the vehicle speed and steering angle to determine if the necessary conditions are met and if so, the ECU will effect the wheeltrack change by actuating the electric motors 138, 191 and 370. To initiate the wheeltrack change, the driver simply presses a button that will activate the electric motors 138, 191 and 370. The ECU may be programmed to increase or decrease the wheeltracks 50 and 51 until the button is turn off. The ECU may be programmed in one or more preset steps corresponding to a certain amount of increase or decrease in width of the wheeltracks 50 and 51. The ECU may also be programmed in one or more preset steps corresponding to specific positions of the wheels.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
   a frame;
   a central longitudinal axis;
   at least four wheels suspended from the frame, each of the at least four wheels including a tire;
   an engine mounted to the frame and being operatively connected to at least two of the at least four wheels;
   a steering assembly operatively connected to at least two of the at least four wheels;
   a suspension having left and right upper suspension arms and left and right lower suspension arms, each suspension arm having a proximal end and a distal end;
   an actuated adjustment mechanism that simultaneously adjust a distance between the proximal ends of the left and right upper and lower suspension arms and the central longitudinal axis of the vehicle, the actuated adjustment mechanism including at least one left lever member pivotally connected to the frame and at least one right lever member pivotally connected to the frame, the left upper and lower suspension arms connected to the at least one left lever member and the right upper and lower suspension arms connected to the at least one right lever member, the at least one left and one right lever members actuated to laterally move the left and right upper and lower suspension arms relative to the central longitudinal axis of the vehicle; and
   an upper and a lower left lever member pivotally connected to the frame and an upper and a lower right lever member pivotally connected to the frame, the upper and lower left and right lever members each including a first end, a second end and a pivot point located between the first end and the second end, the left upper and lower suspension arms being connected to the first end of the upper and lower left lever member respectively, the right upper and lower suspension arms being connected to the first end of the upper and lower right lever member respectively, the second ends of the upper and lower left and right lever members operatively connected to an actuator, the actuator including an endless screw connected to the second ends of the upper and lower left and right lever members via a nut slidably mounted onto the second ends of the upper and lower left and right lever members.

2. A vehicle as defined in claim 1, further comprising a rotary actuator operatively connected to the endless screw.

3. A vehicle comprising:
   a frame;
   a central longitudinal axis;
   at least four wheels suspended from the frame, each of the at least four wheels including a tire;
   an engine mounted to the frame and being operatively connected to at least two of the at least four wheels;
   a steering assembly operatively connected to at least two of the at least four wheels,
   the steering assembly including left and right steering rods both connected to a first rack & pinion assembly mounted to a support member, the support member connected to a second rack & pinion assembly;
   a suspension having left and right upper suspension arms and left and right lower suspension arms, each suspension arm having a proximal end and a distal end; and
   an actuated adjustment mechanism that simultaneously adjust a distance between the proximal ends of the left and right upper and lower suspension arms and the central longitudinal axis of the vehicle.

4. A vehicle as defined in claim 3, wherein the first rack & pinion assembly is adapted to adjust a distance between the left and right steering rods and the central longitudinal axis of the vehicle.

5. A vehicle as defined in claim 4, wherein the first rack & pinion assembly is actuated by a rotary motor which is synchronized with the actuated adjustment mechanism.

6. A vehicle as defined in claim 5, further comprising an ECU operatively connected to the first rack & pinion assembly and the actuated adjustment mechanism.

7. A vehicle as defined in claim 1, wherein the upper and lower lever members each include a front lever, a rear lever, an upper cross member and lower cross member, the upper and lower cross members connecting the front and rear levers together and defining a rigid pivoting structure.

8. An all terrain vehicle comprising:
   a frame;
   a central longitudinal axis;
   a suspension having left and right upper suspension arms and left and right lower suspension arms, the left upper and lower suspension arms each operatively connected to the frame at their proximal ends and to a ground engaging element at their distal ends, the right upper and lower suspension arms each operatively connected to the frame at their proximal ends and to a ground engaging element at their distal ends;
   a first actuated adjustment mechanism that simultaneously adjust a distance between the proximal ends of the left and right upper and lower suspension arms and the central longitudinal axis of the vehicle; and
   a steering assembly operatively connected to the ground engaging elements, the steering system including left and right steering rods both connected to a first rack & pinion assembly mounted to a support member, the support member connected to a second rack & pinion assembly.

9. An all terrain vehicle as defined in claim 8, wherein the first actuated adjustment mechanism includes an upper and a lower left lever member pivotally connected to the frame and an upper and a lower right lever member pivotally connected to the frame; wherein the upper and lower left and right lever members each include a first end, a second end and a pivot point located between the first end and the second end; the left upper and lower suspension arms being connected to the first end of the upper and lower left lever member respectively, the right upper and lower suspension arms being connected to the first end of the upper and lower right lever member respectively, the second ends of the upper and lower left and right lever members operatively connected to an actuator.

10. An all terrain vehicle as defined in claim 8, further comprising a trailing arm rear suspension having a left trailing arm and a right trailing arm, each trailing arm having a proximal end and a distal end, the proximal end of each trailing arm movably connected to the frame; and
- a second actuated adjustment mechanism that simultaneously adjusts a distance between the proximal ends of the left and right trailing arms and the central longitudinal axis of the vehicle.

11. An all terrain vehicle as defined in claim 10, wherein the first and second actuated adjustment mechanism each include at least one endless screw operatively connected to the left and right upper and lower suspension arms and at least one endless screw operatively connected to the left and right trailing arms respectively.

12. An all terrain vehicle as defined in claim 11, wherein the at least one endless screw is operatively connected to a rotary actuator selected from the group consisting of an electric motor, an electric rotary actuator and an hydraulic rotary actuator.

13. An all terrain vehicle as defined in claim 10, further comprising an ECU operatively connected to the first rack & pinion assembly and to the first and second actuated adjustment mechanisms, the ECU synchronizing the actuation of the first rack & pinion assembly and to the first and second actuated adjustment mechanisms.

* * * * *